United States Patent [19]
Chitakyan et al.

[11] 3,946,333
[45] Mar. 23, 1976

[54] APPARATUS FOR OPTICALLY PUMPING LASERS WITH SOLAR ENERGY

[75] Inventors: Onik Kevork Chitakyan; Mihail Georgiev Shterev, both of Burgas, Bulgaria

[73] Assignee: Republikanski Centar sa TNTM, Sofia, Bulgaria

[22] Filed: Oct. 17, 1974

[21] Appl. No.: 515,556

[30] Foreign Application Priority Data
Oct. 18, 1973 Bulgaria.................................. 24351

[52] U.S. Cl............................................. 331/94.5 P
[51] Int. Cl.².......................................... H01S 3/091
[58] Field of Search...................... 331/94.5; 330/4.3

[56] References Cited
UNITED STATES PATENTS
3,453,556  7/1969  Szpur............................. 331/94.5 P
3,786,370  1/1974  Barry et al...................... 331/94.5 P
3,808,428  4/1974  Barry et al...................... 331/94.5 P

*Primary Examiner*—William L. Sikes

[57] ABSTRACT

An optical pumping system employs a first concave reflector for collecting solar energy and directing it toward a second concave reflector facing the first reflector in confocal relation therewith. The resulting collimated solar beam is redirected toward the first reflector and intercepted by a third reflector having planar walls that diverge toward the second reflector at equal acute angles to the common optical axis of the first and second reflectors; the third reflector causes the intercepted beam to uniformly excite a laser positioned along the optical axis between the diverging walls of the third reflector.

5 Claims, 2 Drawing Figures

APPARATUS FOR OPTICALLY PUMPING LASERS WITH SOLAR ENERGY

BACKGROUND OF THE INVENTION

This invention relates to a system for optical pumping of lasers with solar energy, such system being particularly useful in space and terrestrial telecommunications.

Several types of systems for optically pumping lasers with solar energy are known. In one such system, a solar-energy collecting concave mirror, a correcting optical system, and a cencentrating sapphire lens designed for introducing solar energy in the working medium of the laser are successively disposed along an optical axis. In another such system, the collecting concave mirror faces a light guide in the form of a truncated sapphire cone, the smaller base of which contacts a sapphire cylinder which contains the working medium of the laser.

Besides being extremely complicated, such existing systems exhibit nonuniform pumping of the laser working medium and require prescribed geometric dimensions of such working medium.

SUMMARY OF THE INVENTION

The optical pumping system of the invention avoids these disadvantages and provides relatively simple facilities whereby the working medium of the laser may be pumped substantially uniformly, regardless of its geometrical dimensions.

In one illustrative embodiment, for optical pumping of lasers with solar energy, a first collecting concave mirror faces a second concave mirror having a common focus therewith. A third relector is disposed intermediate the first and second mirros on their common optical axis. The third reflector has planar walls which diverge toward the second reflector and between which the laser is coaxially supported.

In an alternative embodiment, the third reflector is disposed behind the first reflector in alignment with a central aperture in such first reflector.

In order to direct the working beam of the laser in a direction parallel to the optical axis, the second mirror may also be provided with a central aperture.

BRIEF DESCRIPTION OF THE DRAWING

For a better understanding of the invention, reference should be made to the accompanying drawing, in which.

DETAILED DESCRIPTION

Figure 1:
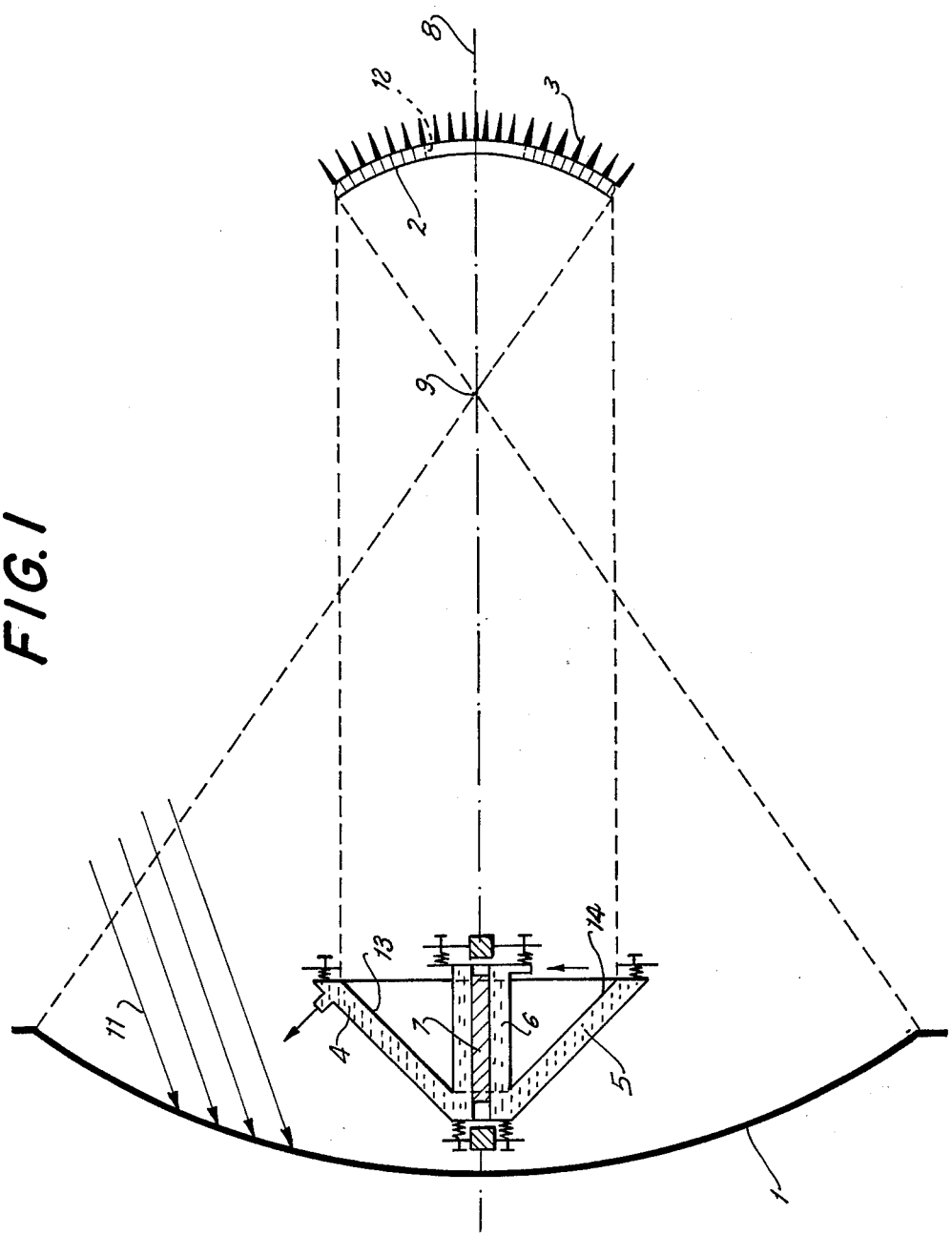
FIG. 1 is a pictorial representation of a first embodiment of a system for optically pumping a laser with solarenergy in accordance with the invention, wherein a third reflector is disposed intermediate first and second confocal concave reflectors.

Referring now to FIG. 1, the improved optical pumping system of the invention includes a first concave reflector 1 (e.g. a mirror) for collecting solar rays represented at 11 and directing them toward a second concave reflector 2. The reflector 2 faces the first reflector and is spaced therefrom along an optical axis 8. The reflector 2 is provided with a central aperture 12 for permitting passage of a beam generated by a laser represented by a quartz tube 6 of any suitable shape surrounding a laser working medium 7. The mirror 2 is provided with cooling facilities represented at 3.

The reflector 2 is disposed in confocal relation with the reflector 1, and serves to collimate the solar beam directed thereto from the reflector 1 and to thereafter direct the collimated beam back toward the reflector 1. The re-directed beam is intercepted by a third reflector 4 which, in the embodiment of FIG. 1, is disposed on the optical axis intermediate the reflectors 1 and 2. The reflector 4 is also provided with cooling facilities represented at 5.

The reflector 4 has a pair of planar walls 13 and 14 which diverge toward the reflector 2 and form equal acute angles to the axis 8. As shown, the laser 6,7 is supported between walls 13, 14 so that its working medium may be substantially uniformly excited throughout its entire length by the solar rays from the mirror 2 that are intercepted and re-directed by the reflector 4 toward the laser. The uniformly excited laser emits a beam which exits from the system through the aperture 12 in the reflector 2.

Figure 2:
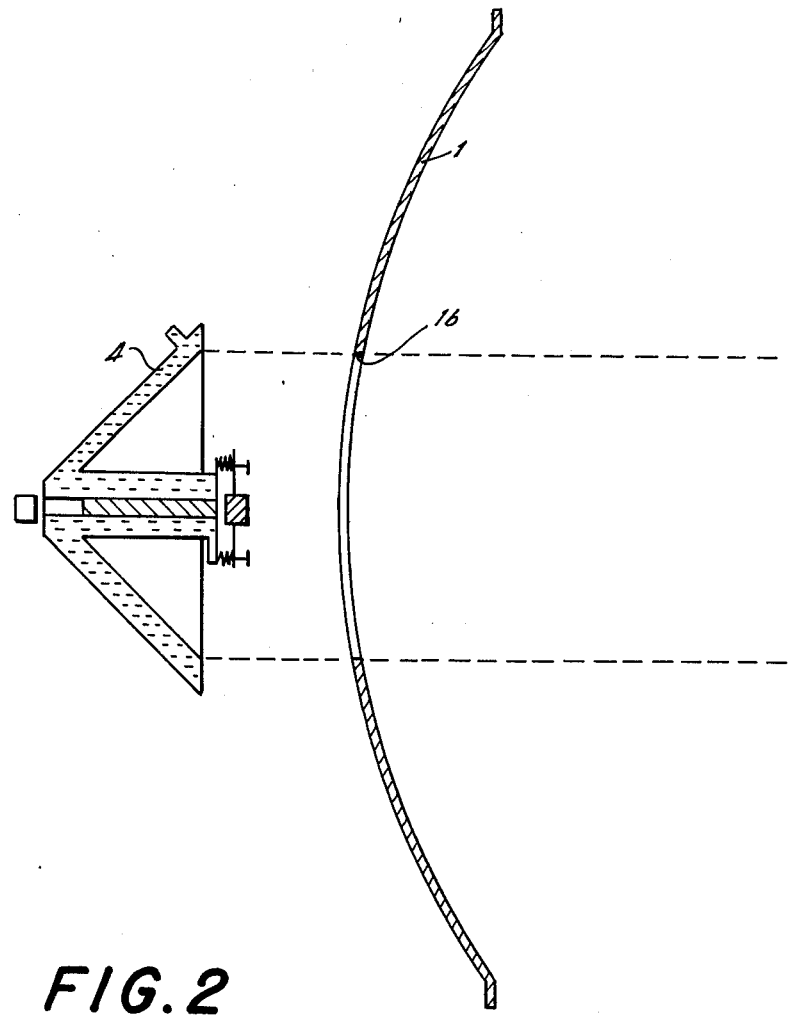
FIG. 2 is a pictorial representation of a modification of a portion of FIG. 1 wherein the third reflector is disposed behind the first reflector in alignment with a central aperture in the first reflector.

In an alternative arrangement shown in FIG. 2, the reflector 4 is positioned behind the reflector 1 to receive a portion of the collimated beam of the reflector 2 (FIG. 1) via a central aperture 16 in the reflector 1.

In the foregoing, the invention has been described in connection with preferred arrangements thereof. Many variations and modifications will now occur to those skilled in the art. It is accordingly desired that the scope of the appended claims not be limited to the specific disclosure herein contained.

What is claimed is:

1. In a system for optically pumping a laser with solar energy, a first concave reflector supported about an optical axis for collecting solar energy, a second concave reflector facing a front surface of the first reflector and disposed in confocal relation with the first reflector about the optical axis, a third reflector spaced from the second reflector in a direction toward the first reflector, the third reflector comprising a pair of planar walls diverging toward the second reflector at substantially equal acute angles to the optical axis, and means for supporting the laser on the optical axis between the diverging walls of the third reflector.

2. A system as defined in claim 1, in which the third reflector is centered on the optical axis.

3. A system as defined in claim 2, in which the third reflector is disposed intermediate the first and second reflectors on the optical axis.

4. A system as defined in claim 2, in which the first reflector has a central aperture extending axially from the front surface to an opposite rear surface thereof, and in which the third reflector is rearwardly spaced from the central aperture of the first reflector.

5. A system as defined in claim 1, in which the second reflector has a central aperture.

\* \* \* \* \*